United States Patent [19]

Domon et al.

[11] Patent Number: 5,373,152
[45] Date of Patent: Dec. 13, 1994

[54] RESONANCE-TYPE OPTICAL RECEIVER CIRCUIT HAVING A MAXIMUM AMPLIFIER INPUT CONTROLLED BY USING AN AMPLIFIER FEEDBACK AND ITS METHOD OF RECEIVING

[75] Inventors: Wataru Domon; Makoto Shibutani, both of Tokyo, Japan

[73] Assignee: NEC Corporation, Japan

[21] Appl. No.: 5,594

[22] Filed: Jan. 19, 1993

[30] Foreign Application Priority Data

Jan. 31, 1992 [JP] Japan .................................. 4-046187
Jun. 9, 1992 [JP] Japan .................................. 4-147825

[51] Int. Cl.⁵ ......................... H04B 10/06; H03G 3/20
[52] U.S. Cl. ................................. 250/214 AG; 359/189
[58] Field of Search ....... 250/214 A, 214 R, 214 AG, 250/214 DC; 359/189, 191, 194, 152, 154; 330/135, 279; 331/181, 34

[56] References Cited

U.S. PATENT DOCUMENTS

| 4,540,952 | 9/1985 | Williams | 330/279 |
| 4,574,249 | 3/1986 | Williams | 330/59 |
| 5,257,285 | 10/1993 | Thorp | 330/293 X |

OTHER PUBLICATIONS

"Tuned Front-End Design for Heterodyne Optical Receivers", G. Jacobsen, et al. Journal of Lightwave Technology, vol. 7, No. 1, Jan. 1989, pp. 105–114.

"Tuned Optical Receivers for Microwave Subcarrier Multiplexed Lightwave Systems", Kamal E. Alameh et al., IEEE Transactions on Microwave Theory and Techniques, vol. 38, No. 5, May 1990, pp. 546–551.

"Resonant p-i-n FET Receivers for Lightwave Subcarrier Systems", Thomas E. Darcie, et al, Journal of Lightwave Technology, vol. 6, No. 4, Apr. 1988, pp. 582–589.

"A Novel Resonance-Type Optical Receiver for High--Speed Optical Heterodyne Transmission Systems", Noboru Takachio et al., Journal of Lightwave Technology, vol. 7, No. 9, Sep. 1989, pp. 1371–1378.

*Primary Examiner*—David C. Nelms
*Assistant Examiner*—John R. Lee
*Attorney, Agent, or Firm*—Laff, Whitesel, Conte & Saret

[57] ABSTRACT

The present invention provides a resonance-type optical receiver circuit which keeps predetermined small distortion even when the received light level becomes high. The resonance-type optical receiver circuit varies the resistance value of variable resistance element 80, which is used as a load resistor to optical detector 4, in response to the intensity of output signal 10 of an amplifier. The load resistor varies in response to a variations of the received light level of the optical detector in this manner to keep the input to the amplifier lower than a fixed value.

2 Claims, 12 Drawing Sheets

F I G.10
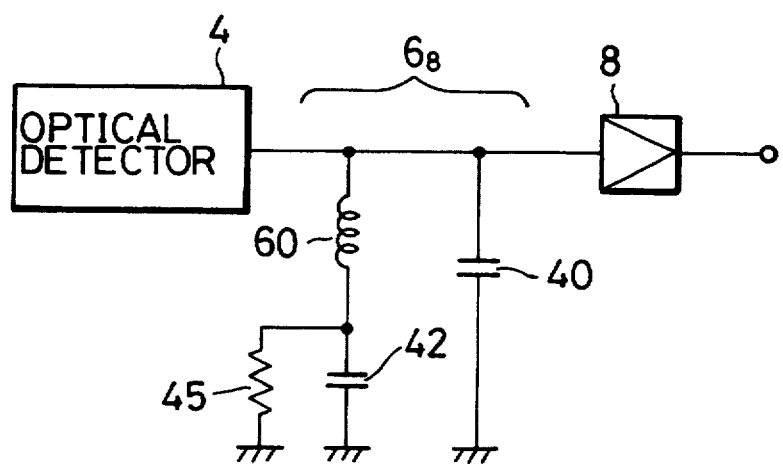

F I G.11
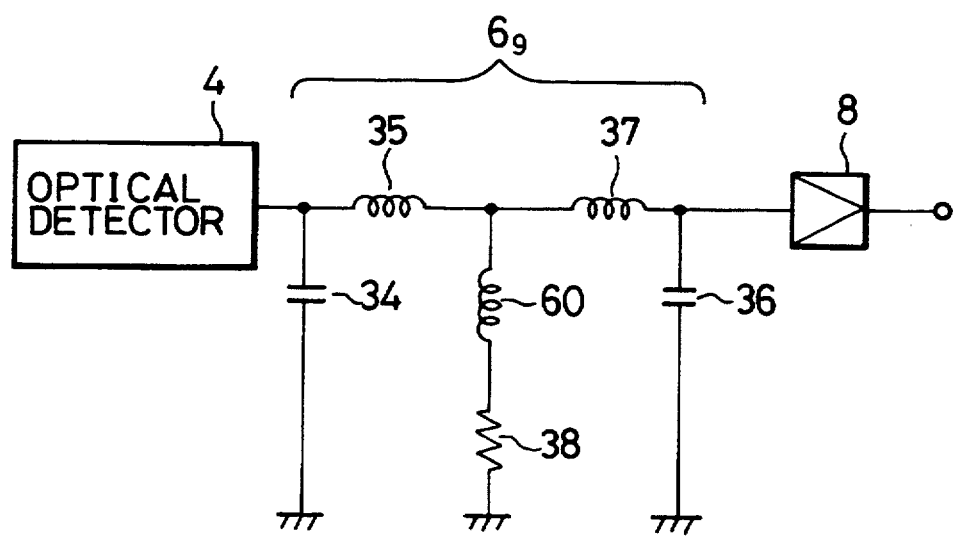

RESONANCE-TYPE OPTICAL RECEIVER CIRCUIT HAVING A MAXIMUM AMPLIFIER INPUT CONTROLLED BY USING AN AMPLIFIER FEEDBACK AND ITS METHOD OF RECEIVING

BACKGROUND OF THE INVENTION

1. Field of the Invention

This invention relates to a resonance-type optical receiver circuit for a optical communication system and to a method of receiving the light waves for the circuit.

2. Description of Related Art

A resonance-type optical receiver circuit includes a tuning circuit interposed between an optical detector and an amplifier. At the tuning frequency of the tuning circuit, the load impedance of the optical detector is high and circuit noise of the optical receiver circuit is suppressed. Accordingly, when a high frequency signal such as a radio signal which is low in ratio (fractional band width) between a required band and a center frequency is transmitted, a high reception sensitivity can be realized by employing a resonance-type optical receiver circuit. Known circuit types of the resonance-type optical receiver circuits include, for example, the parallel tuning type, the transformer tuning type, the mixed tuning type and the third-order band pass tuning type. Those resonance-type optical receiver circuits are disclosed in G. Jacobsen et al., "Tuned Front-End Design for Heterodyne Optical Receivers", Journal of Lightwave Technology, Vol. 7, No. 1, p. 105, 1989; Kamal E. Alameh et al., "Tuned Optical Receivers for Microwave Subcarrier Multiplexed Lightwave System", Journal of IEEE transactions on Microwave Theory and Techniques, Vol. 38, No. 5, May 1990; Thomas B. Darcie et al., "Resonant P-i-n FET Receivers for Lightwave Subcarrier System", Journal of Lightwave Technology, Vol. 6, No. 4, April 1988; and Noboru Takachio et al., "A Novel Resonance-Type Optical Receiver for High-Speed Optical Heterodyne Transmission System", Journal of Lightwave Technology, Vol. 7, No. 9, September 1989. The resonance-type optical receiver circuits disclosed, however, are publications of the results of research into circuits to prevent noise involved in receiving.

In order to realize a high receiving sensitivity with a resonance-type optical receiver circuit, the load impedance of the optical detector must be high. However, where the load impedance of the optical detector is high, when a light signal of a high level is inputted, the input level to the amplifier in the optical receiver circuit is so high that the output signal of the optical receiver circuit may possibly be distorted. Distortion due to the high level input results a serious problem particularly when a high frequency signal in which a large number of carriers is multiplied optically transmitted.

Further, in a resonance-type optical receiver circuit, it is necessary to have the tuning frequency coincide exactly with the frequency of the received signal. However, under the influence of the quality dispersion of parts, the tuning frequency is sometimes drifts from the frequency of the received signal. This frequency drift matters when a resonance-type optical receiver circuit is actually manufactured or actually used.

Further, in resonance-type optical receiver circuits, an inductor is connected between the optical detector and the ground. Accordingly, when the signal has a very low frequency, the load impedance of the optical detector is low and the level of the signal inputted to the amplifier is very low. Further, with regard to the dc signals, the output of the optical detector is almost equivalent to be short-circuited directly to the ground, so that the dc signal is not inputted to the amplifier. Accordingly, with conventional resonance-type optical receiver circuits, it is difficult to receive a low frequency signal (for example, a base band signal of a television signal or a digital signal, or a modulation signal having a very low carrier frequency) simultaneously with a high frequency signal.

SUMMARY OF THE INVENTION

It is a first object of the present invention to provide a resonance-type optical receiver circuit which presents small distortion even when the level of received light becomes high and which compensates for tuning frequency drift and methods of receiving a light wave for the circuit.

It is a second object of the present invention to provide a resonance-type optical receiver circuit which can receive a low frequency signal at a high sensitivity simultaneously with a high frequency signal.

In order to attain the first object, according to a first aspect of the present invention, there is provided a resonance-type optical receiver circuit which includes an optical detector, an amplifier and a tuning circuit interposed between the optical detector and the amplifier, characterized in that the optical receiver circuit comprises a variable resistance element provided as a load resistor to the optical detector, the variable resistance value which automatically varies in response to the control current and a control circuit for generating the voltage of the difference between the output voltage of the amplifier and a predetermined reference voltage and outputting a current corresponding to the difference voltage as the control current for the variable resistance element to keep the input level to the amplifier lower than a fixed value.

In order to attain the first object, according to a second aspect of the present invention, there is provided a resonance-type optical receiver circuit which includes an optical detector, an amplifier and a tuning circuit interposed between the optical detector and the amplifier, characterized in that the optical receiver circuit comprising a PIN diode provided as a load resistor to the optical detector and receiving the detected current of the optical detector as a bias current to keep the input level to the amplifier outputted from the optical detector lower than a fixed value.

In order to attain the first object, according to a third aspect of the present invention, there is provided a method of receiving a light wave, the method comprises the procedure of varying the tuning frequency in response to the receiving level of an optical detector to keep the input level to the amplifier lower than a fixed value.

In order to attain the first object, according to a fourth aspect of the present invention, there is provided a method of receiving the light waves, the method comprises the procedure of varying the tuning frequency in response to the signal outputted from the amplifier to keep the input level to the amplifier lower than a fixed value.

In order to attain the first object, according to a fifth aspect of the present invention, there is provided a resonance-type optical receiver circuit which includes an optical detector, an amplifier and a tuning circuit interposed between the optical detector and the amplifier, characterized in that the optical receiver circuit comprises a resistance element through which a detected current of the optical detector flows, and a control circuit for generating the voltage of the difference between a voltage drop of the resistance element and a predetermined reference voltage and feeding back the difference voltage as a bias voltage to the optical detector to vary the tuning frequency to keep the input level to the amplifier lower than a fixed value.

In order to attain the first object, according to a sixth aspect of the present invention, there is provided a resonance-type optical receiver circuit which includes an optical detector, an amplifier and a tuning circuit interposed between the optical detector and the amplifier, characterized in that the optical receiver circuit comprising a variable capacitance element provided in the tuning circuit and having a capacitance value which automatically varies in response to a variation of a control voltage, and a control circuit for generating the voltage of the difference between the output voltage of the amplifier and a predetermined reference voltage and applying an output voltage corresponding to the difference voltage as a control voltage to the variable capacitance element to keep the input level to the amplifier lower than a fixed value.

In order to attain the second object, according to a seventh aspect of the present invention, there is provided a resonance-type optical receiver circuit which includes an optical detector, an amplifier and a tuning circuit interposed between the optical detector and the amplifier and wherein the output of the optical detector and the ground are interconnected by way of at least one inductor, characterized in that the optical receiver circuit comprising an impedance element connected in series to the inductor between the output of the optical detector and the ground for blocking a low frequency band. The impedance element may be a capacitor.

The resonance-type optical receiver circuit may be constructed so that the impedance element is a capacitor, and in parallel to a branch having an inductor and a capacitor, the output of the optical detector and the ground are interconnected at least through any one of a resistor, an inductor, a resistor and an inductor connected in series, or a resistor and an inductor connected in parallel.

Further, the resonance-type optical receiver circuit having a capacitor as the impedance element may be connected in series to the inductor wherein the capacitor may be connected in parallel with any one of a resistance element, an inductor, a resistor and an inductor connected in series, or a resistor and an inductor connected in parallel.

According to an eighth aspect of the present invention, there is provided a resonance-type optical receiver circuit which includes an optical detector, an amplifier and a tuning circuit interposed between the optical detector and the amplifier and wherein the output of the optical detector and the ground are interconnected through at least one inductor, characterized in that the optical receiver circuit comprises a resistance element connected in series to the inductor between the output of the optical detector and the ground.

Other and further objects, features and advantages of the invention will appear more fully from the following description.

BRIEF DESCRIPTION OF THE DRAWINGS

FIG. 10 is a circuit diagram of an eighth embodiment of the resonance-type optical receiver circuit of the present invention;

FIG. 11 is a circuit diagram of a ninth embodiment of the resonance-type optical receiver circuit of the present invention.

DESCRIPTION OF THE PREFERRED EMBODIMENTS

Preferred embodiments of the present invention are next described with reference to the circuit diagrams.

Figure 1:
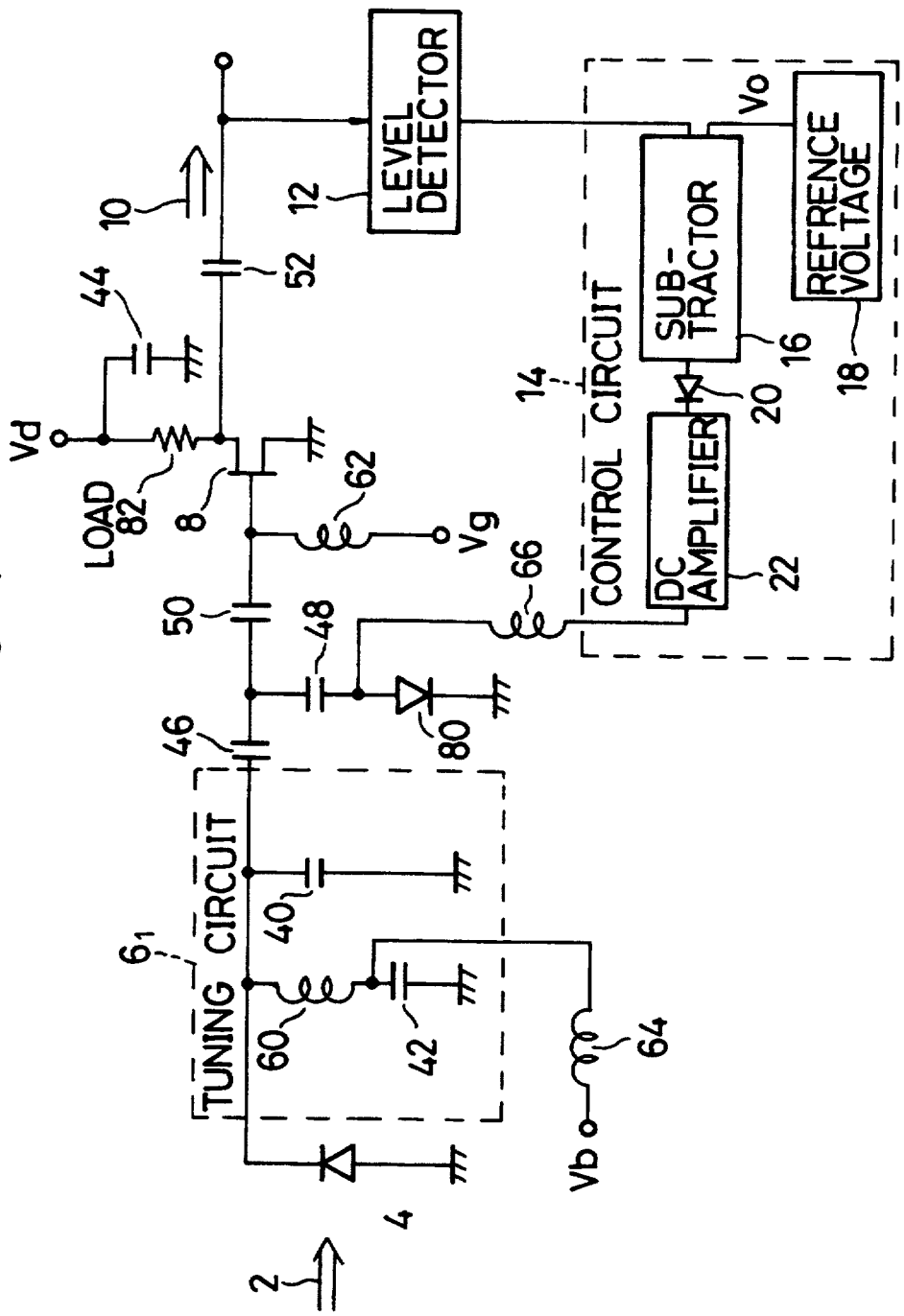
FIG. 1 is a circuit diagram of a first embodiment of the resonance-type optical receiver circuit of the present invention.

FIG. 1 is a circuit diagram of a first embodiment of the resonance-type optical receiver circuit of the present invention. In the present embodiment, two carrier waves of 816.0 MHz and 816.3 MHz are received simultaneously. Light signal 2 inputted to the optical receiver circuit is intensity modulated at the optical modulation index of 10% per one carrier with the two radio carriers.

In this embodiment, a parallel resonance circuit including capacitor 40 and inductor 60 is employed for tuning circuit $6_1$. Inductor 60 is grounded at a high frequency by way of capacitor 42 of a large capacity. A PIN photodiode is employed for optical detector 4, and bias voltage Vb is applied to optical detector 4 by way of inductor 60 and choke coil 64. Variable resistance element 80 is connected in parallel to tuning circuit 60. A PIN diode whose resistance value to a high frequency signal is varied significantly by a value of a forward current is employed for variable resistance element 80. An FET whose source is grounded is employed for amplifier 8. Gate voltage Vg is applied to amplifier 8 through choke coil 62, and drain voltage Vd is supplied to amplifier 8 through load resistor 82. Capacitor 44 serves as a capacitor for bypassing a high frequency signal, and capacitors 46, 48, 50 and 52 serve as capacitors for blocking the dc components.

In this embodiment, the intensity of amplifier output signal 10 is controlled to a fixed value by so-called feedback control. In particular, the intensity of amplifier output signal 10 is detected by level detector 12 and inputted as an error signal to control circuit 14. At control circuit 14, the difference between the output voltage of level detector 12 and reference voltage Vo from reference voltage source 18 is taken by subtractor 16 and inputted to dc amplifier 22. An output current of dc amplifier 22 flows forward corresponding to the output of subtractor 16 through variable resistor element 80 through choke coil 66. However, when the output voltage of subtractor 16 is a negative value, the output of subtractor 16 is blocked by diode 20. Consequently, the output of dc amplifier 22 is reduced to 0.

In this embodiment, when the amplifier output signal 10 is lower than −6 dBm/carrier, the output of subtractor 16 is a negative value, and the forward current of the variable resistance element 80 is reduced to 0. Then the value of variable resistance element 80 then is 50 kΩ. On the other hand, when amplifier output signal 10 is −6 dBm/carrier, the forward current of variable resistance element 80 is increased and the resistance value of variable resistance element 80 is decreased until amplifier output signal 10 is reduced to −6 dBm/carrier. Due to the feedback control just described, amplifier output signal 10 is kept lower than −6 dBm/carrier irrespective of the level of received light. Accordingly, in the present embodiment, the ratio of tertiary distortion which occurs in amplifier 8 is suppressed lower than −80 dBc irrespective of the level of received light.

Figure 2:
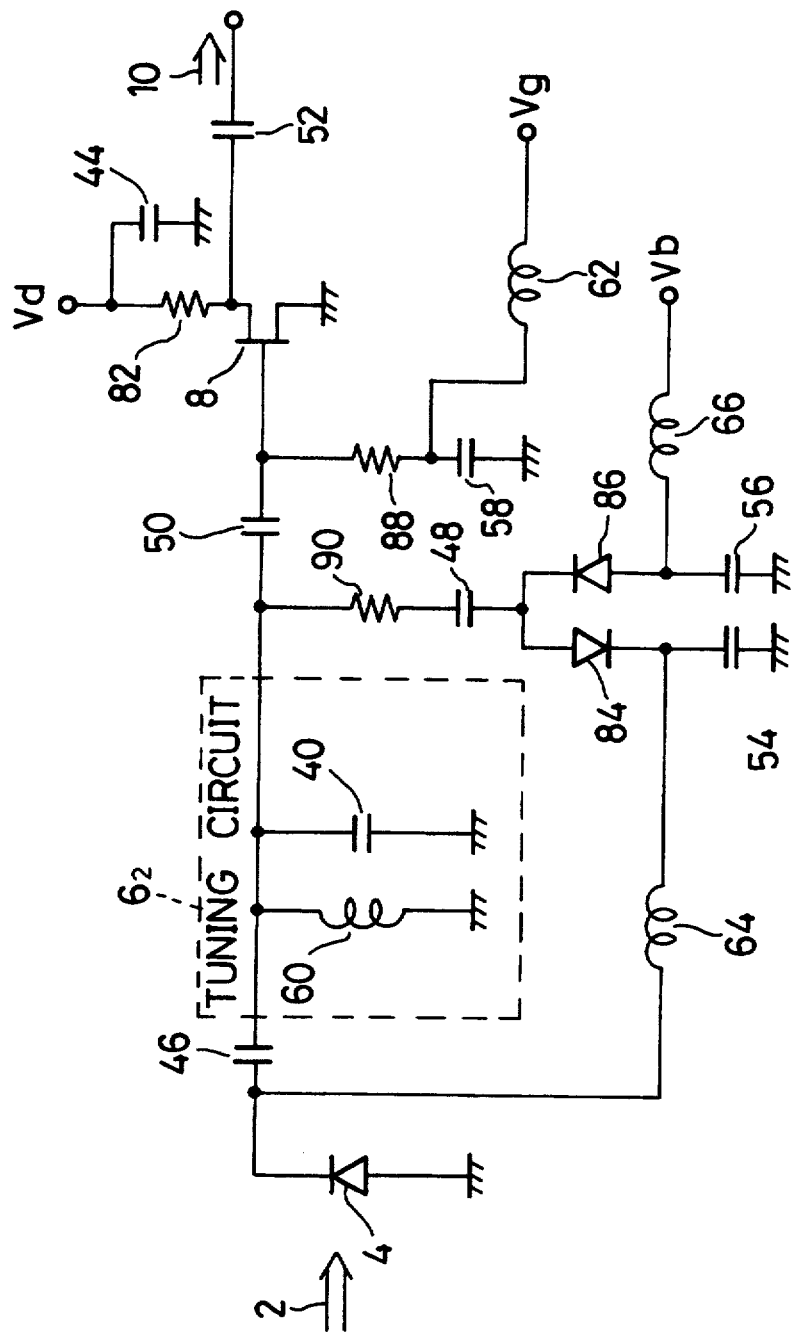
FIG. 2 is a circuit diagram of a second embodiment of the resonance-type optical receiver circuit of the present invention.

FIG. 2 is a circuit diagram showing a second embodiment of the resonance-type optical receiver circuit of the present invention. In this embodiment, a photo current flowing through optical detector 4 is used as a bias current for PIN diodes 84 and 86 in order to control the load resistance value of optical detector 4. As shown in FIG. 2, resistor 88 having a resistance value of 4 kΩ, resistor 90 having a resistance value of 20Ω and PIN diodes 84 and 86 are connected in parallel to tuning circuit 6₂ which includes inductor 60 and capacitor 40. The reason why PIN diodes 84 and 86 are connected in parallel to each other but in opposite directions is to reduce distortion by cancelling the non-linearities of the PIN diodes with the connection. Bias voltage $V_b$ is supplied to optical detector 4 through choke coil 66, PIN diodes 84 and 86 and choke coil 64. Meanwhile, gate voltage Vg of amplifier 8 is supplied through resistor 88 and choke coil 62. Capacitors 44, 54, 56 and 58 serve capacitors for bypassing a high frequency signal, and capacitors 46, 48, 50 and 52 serve as capacitors for blocking the dc components.

In this embodiment, a PIN photodiode having a photoelectric conversion efficiency of 0.8 mA/mW is employed for optical detector 4. Accordingly, when the received light level is, for example, 0.05 mW, the photo current flowing through optical detector 4 and PIN diodes 84 and 86 is 0.04 mA. The resistance values of PIN diodes 84 and 86 are then both 2 kΩ, and the load resistance value of optical detector 4 at the tuning frequency is 800Ω. Amplifier output signal 10 then is −14 dBm/carrier. On the other hand, when the received light level is increased 100 times, that is, to 5 mW, if the load resistance value of optical detector 4 remains equal to 800Ω, then amplifier output signal 10 increases to 26 dBm/carrier. Consequently, very great distortion occurs. In this embodiment, however, a photo current of 4 mA flows through PIN diodes 84 and 86, and the resistance values of PIN diodes 84 and 86 drop to 20Ω. Accordingly, the load resistance value of optical detector 4 at the tuning frequency drops to 20Ω and amplifier output signal 10 is suppressed to −6 dBm/carrier. In this manner, in this embodiment, since the load resistance value of optical detector 4 decreases as the received light level increases, even when the received light level reaches 5 mW, the ratio of third order distortion at amplifier 8 is suppressed to less than −80 dBc.

Figure 3:
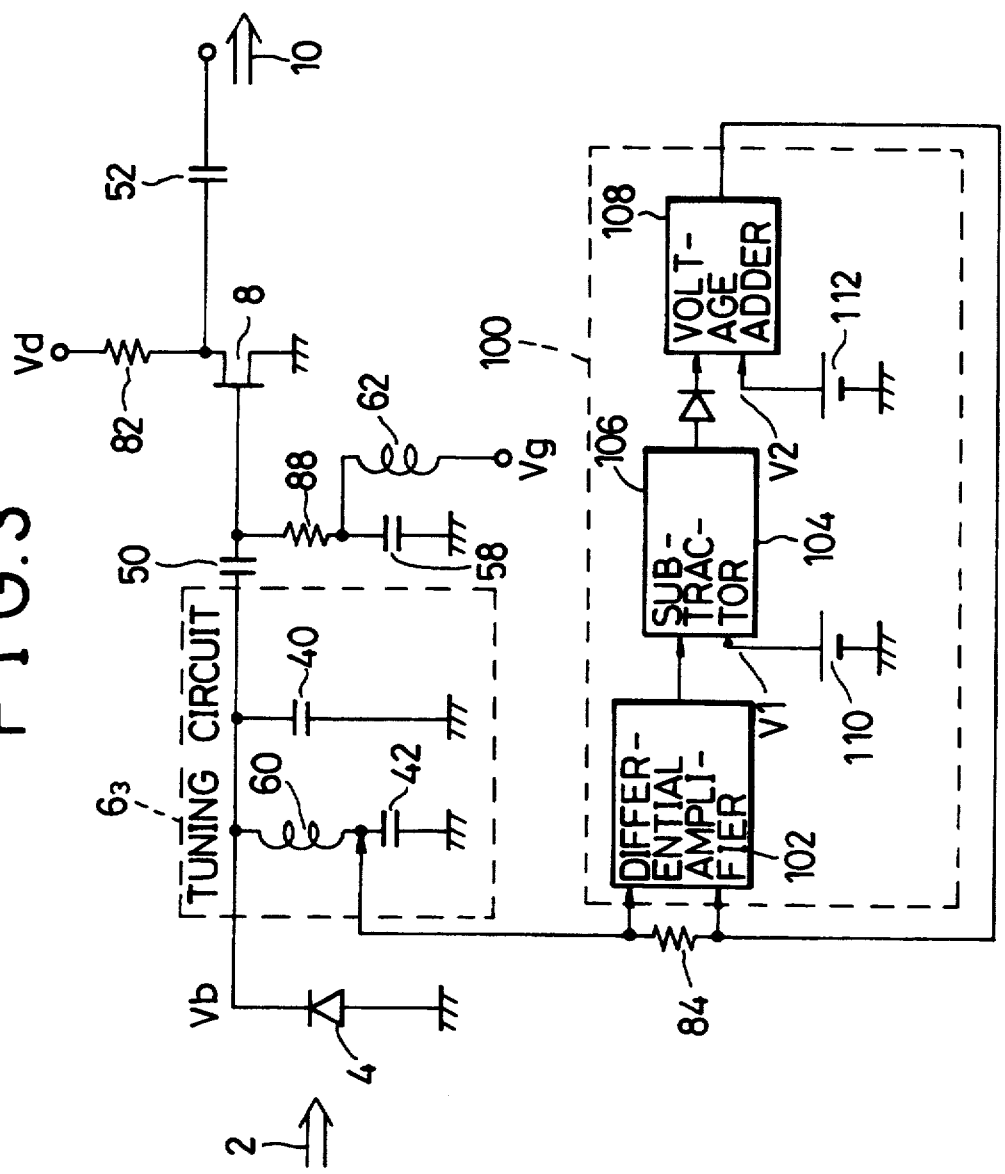
FIG. 3 is a circuit diagram of a third embodiment of the resonance-type optical receiver circuit of the present invention.

FIG. 3 is a circuit diagram showing a third embodiment of the resonance-type optical receiver circuit of the present invention. In this embodiment, a parallel resonance circuit including capacitor 40 and inductor 60 is employed for tuning circuit 6₃, and inductor 60 is grounded at a high frequency through capacitor 42 of a large capacity. A PIN photodiode is employed for optical detector 4, and bias voltage $V_b$ is applied to optical detector 4 through inductor 60. An FET whose source is grounded is employed for amplifier 8, and gate electrode voltage $V_g$ is supplied to amplifier 8 through choke coil 62 and resistor 88. Resistor 88 is grounded at a high frequency through capacitor 58 of a large capacity and serves as a load resistor to optical detector 4. Drain voltage $V_d$ is supplied to the FET through load resistor 82. It is to be noted that capacitors 50 and 52 serve as capacitors for blocking the dc currents.

In this embodiment, the tuning frequency is controlled by varying bias voltage Vb of photo detector 4 as an error signal which is a photo electric current flowing through optical detector 4 and detected by resistor 84. At control circuit 100, a voltage drop of resistor 84 is detected by means of differential amplifier 102, and the difference between the output voltage of differential amplifier 102 and reference voltage V₁ is taken by subtractor 104. When the output of differential amplifier 102 is higher than reference voltage v₁, the output of subtractor 104 is inputted to voltage adder 108. Thus bias voltage $V_b$ for optical detector 4 is the sum of the output voltage of subtractor 104 and another reference voltage V₂. On the other hand, when the output of differential amplifier 102 is lower than reference voltage V₁ and the output voltage of subtractor 104 is negative, the output of subtractor 104 is blocked by diode 106. In this instance, bias voltage $V_b$ of optical detector 4 is equal to reference voltage V₂. In this embodiment, when the received light level is lower than 0 dBm, bias voltage $V_b$ has a fixed value (10V). On the other hand, when the received light level is 0 dBm or more, bias voltage $V_b$ is increased in accordance with the received light level. For example, when the received light level is 3 dBm, bias voltage $V_b$ is 12V.

Resonance frequency f of tuning circuit 6₃ is given by $$f = 1/(2\pi \sqrt{LC})$$

where C is the parallel composite capacitance of capacitor 40 and optical detector 4, and L is the inductance of inductor 60. In this embodiment, inductance L of inductor 60 is 20 nH. Accordingly, the tuning frequency of the present optical receiver circuit is 816 MHz, which is equal to the frequency of the received signal, and the 3 dB band width of the tuning frequency is 10 MHz. The intensity of the output of amplifier 8 when the tuning frequency coincides with the received signal frequency in this manner is −6 dBm/carrier when the received light level is 0 dBm. Further, the tertiary distortion ratio of amplifier output signal 10 is then −80 dBc. On the other hand, when the received light level is 3 dBm, bias voltage $V_b$ is 12V, parallel composite capacitance C is 1.85 pF and the tuning frequency is 827 MHz. In this instance, the load impedance of optical detector 4 at the received signal frequency (816 MHz) drops, and although the received light level has risen to 3 dBm, the intensity of amplifier output signal 10 is kept equal to −6 dBm as same as the case when the received light level is 0 dBm. Accordingly, the ratio of tertiary distortion occurring at amplifier 8 is suppressed to 80 dBc or less irrespective of the received light level.

Figure 4:
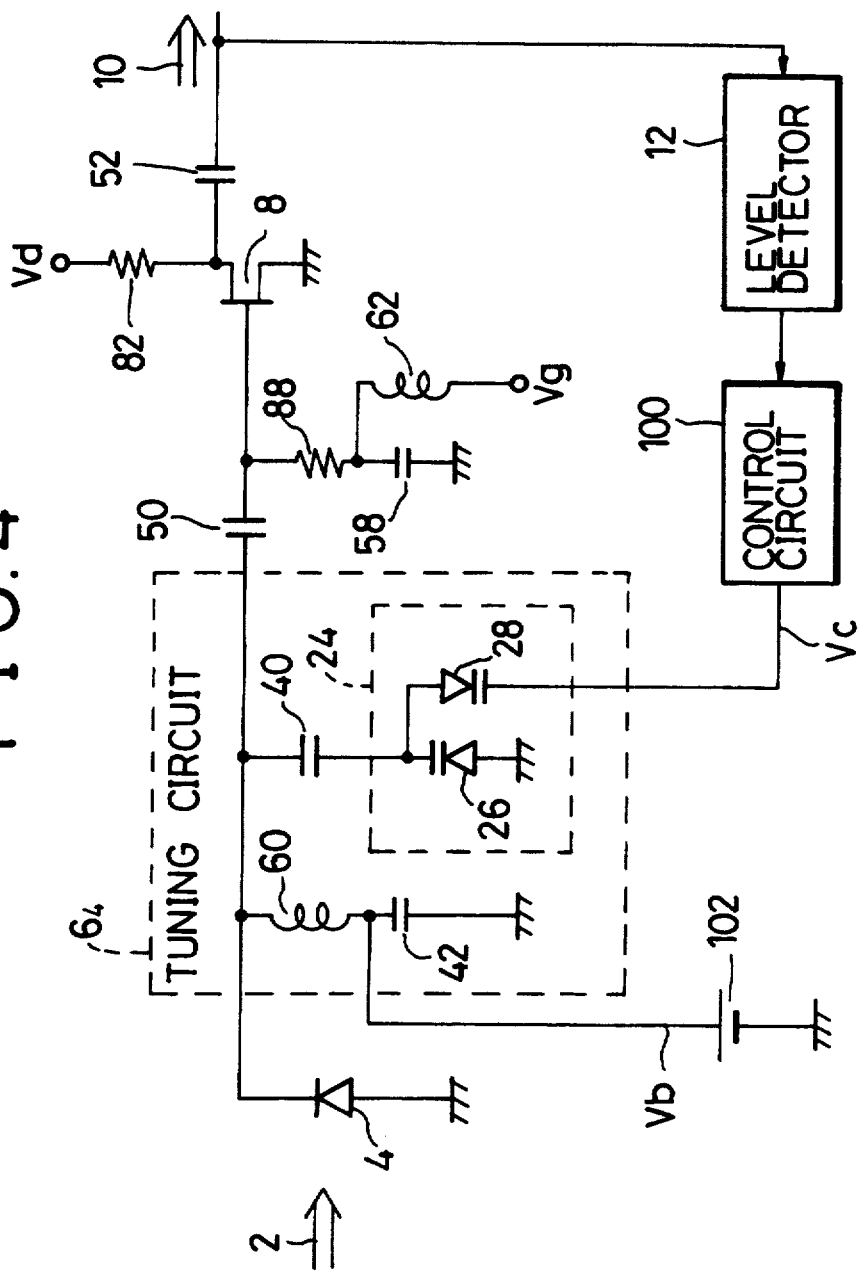
FIG. 4 is a circuit diagram of a fourth embodiment of the resonance-type optical receiver circuit of the present invention.

FIG. 4 is a circuit diagram showing a fourth embodiment of the resonance-type optical receiver circuit of the present invention. In this embodiment, the tuning frequency is controlled by varying the capacitance of variable condenser 24 of tuning circuit $6_4$ under a control signal which is the detected amplifier output signal 10. As shown in FIG. 4, amplifier output signal 10 is detected by level detector 12 and outputted to control circuit 100. Control circuit 100 has a circuit configuration similar to that of the third embodiment, and when the intensity of amplifier output signal 10 is −6 dBm/carrier or less, control voltage $V_c$ outputted from control circuit 100 is fixed (3V). On the other hand, when amplifier output signal 10 is higher than −6 dBm/carrier, control voltage $V_c$ is increased in accordance with amplifier output signal 10, and for example, when amplifier output signal 10 is −3 dBm/carrier, $V_c$ is 4V.

In this embodiment, a pair of varactor diodes 26 and 28 are employed as variable capacitance element 24. However, in order to prevent distortion arising from diode characteristics, varactor diodes 26 and 28 are connected in parallel to each other but in opposite directions as shown in FIG. 4. When amplifier output signal 10 is lower than −6 dBm/carrier, control voltage Vc is 3V, and composite capacitance C' of varactor diodes 26 and 28 and capacitor 40 is 1.9 pF. Thus the tuning frequency of tuning circuit $6_4$ is 816 MHz which is equal to the received signal frequency. On the other hand, when amplifier output signal 10 is higher than −6 dBm/carrier, control voltage $V_c$ is higher than 3V and composite capacitance C' is lower than 1.9 pF. In this instance, the tuning frequency of tuning circuit $6_4$ drifts to the high frequency side with respect to the received signal frequency and amplifier output signal 10 is decreased. Due the negative feedback just described, amplifier output signal 10 is kept lower than −6 dBm/carrier irrespective of the received light level. Accordingly, in this embodiment, the ratio of third order distortion occurring at the amplifier is suppressed below −80 dBc irrespective of the received light level.

Figure 5:
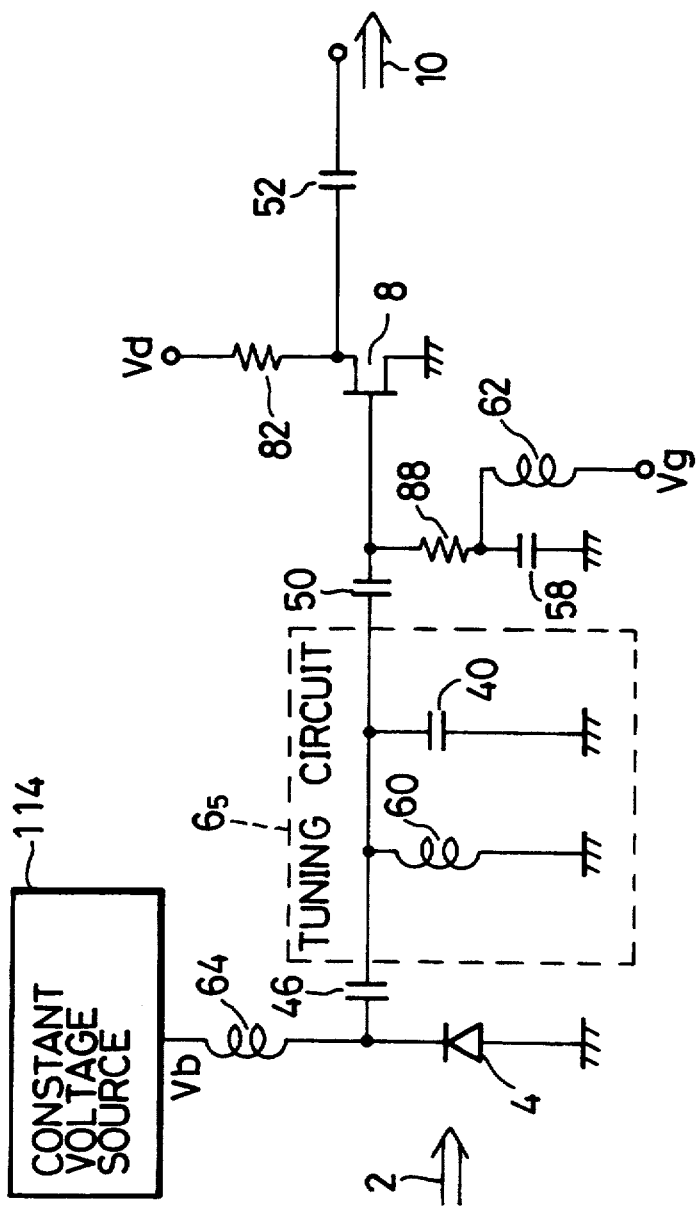
FIG. 5 is a circuit diagram of a fifth embodiment of the resonance-type optical receiver circuit of the present invention.

FIG. 5 is a circuit diagram showing a fifth embodiment of the resonance-type optical receiver circuit of the present invention. In this embodiment, bias voltage Vb is applied to optical detector 4 through choke coil 64. Capacitor 46 serves as a capacitor for blocking the dc components. Bias voltage $V_b$ can be set to an arbitrary value from 10V to 15V by varying the setting of the output of constant-voltage source 114. Consequently, the capacity of optical detector 4 can be varied from 0.95 pF to 0.85 pF, and the tuning frequency can be varied by 10 MHz with respect to the received signal frequency of 816 MHz. Accordingly, even when the tuning frequency of the optical receiver circuit drifts within 10 MHz of its designed value by some dispersion in characteristic of the parts used, this can be compensated for by varying bias voltage $V_b$ of optical detector 4.

Various modifications can be made to the embodiments of the present invention described above. For example, while, in the first embodiment, control circuit 14 is constituted from subtractor 16, reference voltage source 18, diode 20, dc amplifier 22 and other elements and, in the third embodiment, control circuit 100 is constituted from differential amplifier 102, subtractor 104, voltage adder 108 and other elements, they are mere examples of circuit construction, and other circuit construction are possible. For example, a similar control circuit can be realized from a digital circuit employing a microprocessor. Further, while an FET of the source-grounded type is employed as amplifier 8 in the embodiments described above, it is possible to employ some other amplifier such as, for example, a transistor, an FET of the gate-grounded type or an amplifier of the integration type. Furthermore, while a parallel tuning circuit is employed as tuning circuit $6_5$ in the embodiments described above, it is also possible to employ some other tuning circuit such as, for example, a tuning circuit of the transformer type, a mixed tuning circuit or a third-order band pass tuning circuit.

Meanwhile, in the fourth embodiment of the resonance-type optical receiver circuit, a photodiode, an avalanche photodiode, a phototransistor and other can be employed for optical detector 4 as well as a PIN photodiode. Further, while, in the fourth embodiment, variable capacitance element 12 is connected in parallel to tuning circuit 6, the tuning frequency can be varied otherwise if variable capacitance element 24 is connected in series to tuning circuit $6_4$. Furthermore, while two varactor diodes connected in parallel are employed for variable capacitance element 24, a single varactor diode can be used as the variable capacitance element.

Figure 6:
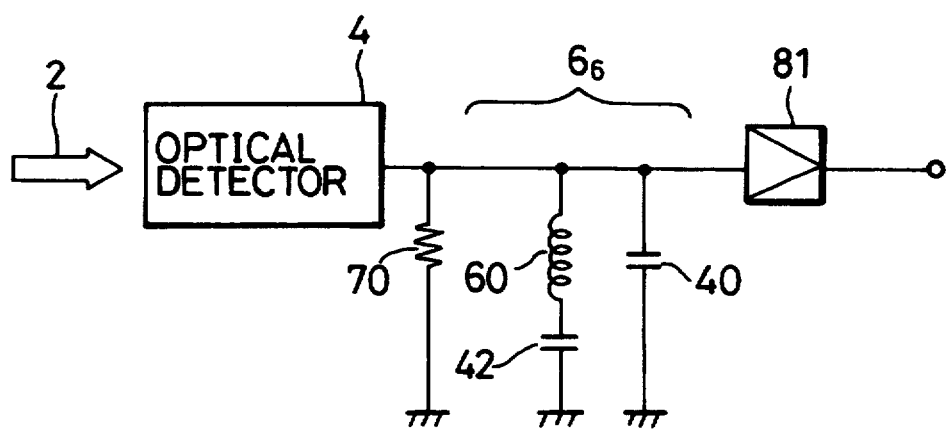
FIG. 6 is a circuit diagram of a sixth embodiment of the resonance-type optical receiver circuit of the present invention.
Figure 7:
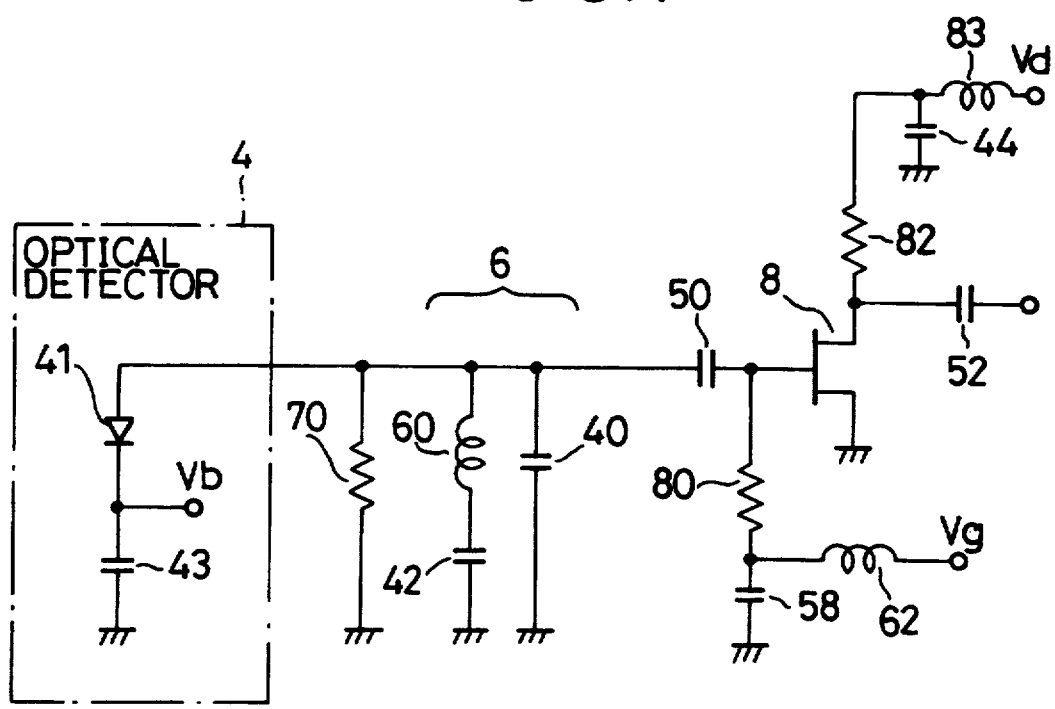
FIG. 7 is a detailed circuit diagram of the resonance-type optical receiver circuit of FIG. 6.
Figure 8:
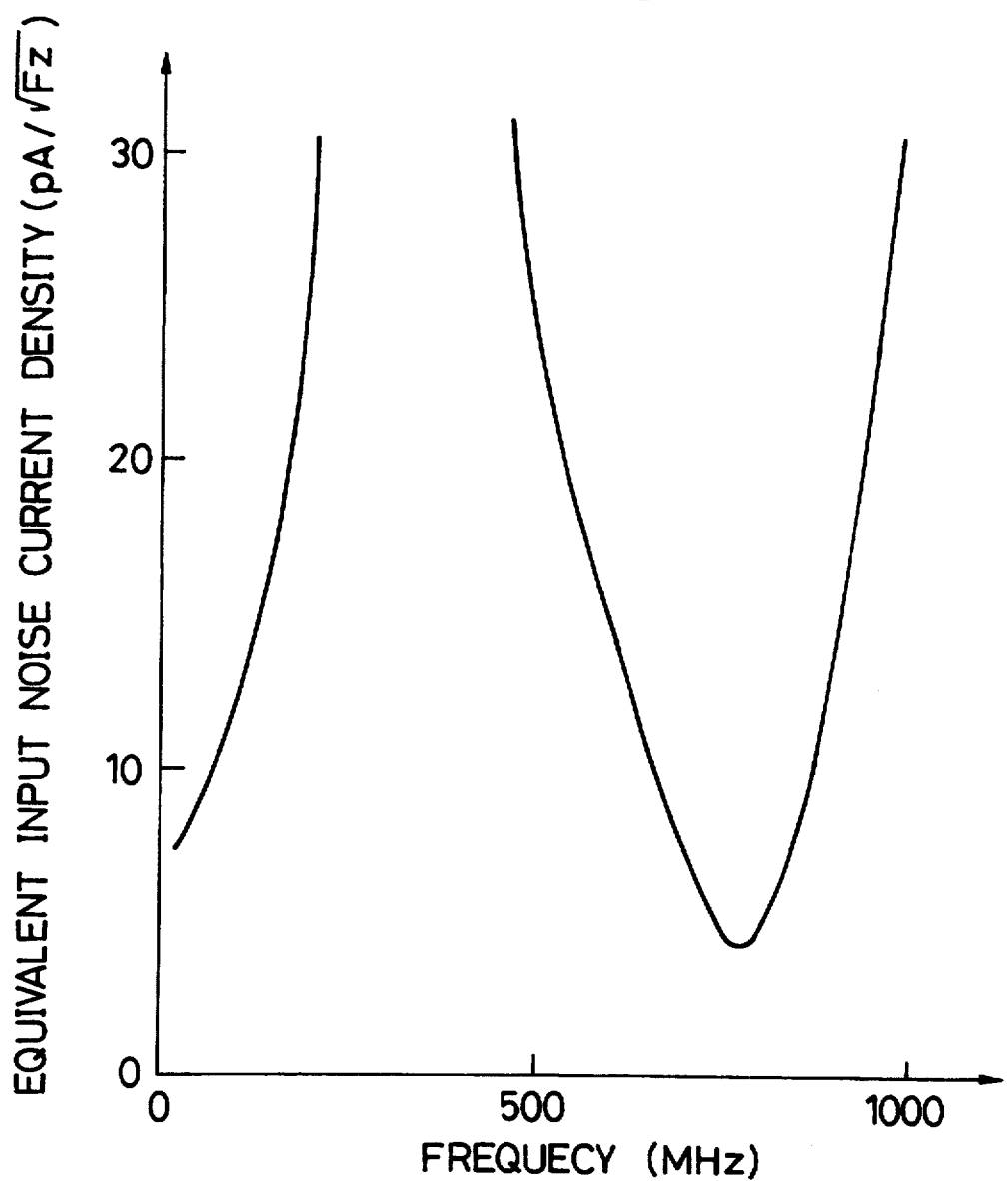
FIG. 8 is a diagram showing a frequency characteristic of the equivalent input noise current density of the sixth embodiment.

FIG. 6 is a circuit diagram showing the construction of a sixth embodiment of the resonance-type optical receiver circuit of the present invention. FIG. 7 is a circuit diagram showing the construction of this embodiment in more detail. Further, FIG. 8 is a graph showing a frequency characteristic of the equivalent input noise current density of the optical receiver circuit of the present embodiment. In the sixth embodiment, a carrier of 1 MHz which is FSK (frequency shift keying) modulated with a digital signal of bit rate of 2,400 bps is received simultaneously with a radio signal of 800 MHz.

As shown in FIGS. 6 and 7, the present optical receiver circuit is constituted from optical detector 4, tuning circuit $6_6$ and amplifier 8. In the sixth embodiment, PIN photodiode 41 is employed for optical detector 4, and bias voltage $V_b$ of +10V is applied to PIN photodiode 41. Meanwhile, an FET having its source grounded is employed as amplifier 8, and gate voltage $V_g$ is supplied to amplifier 8 through choke coil 62 and resistor 88 while drain electrode $d$ is supplied to amplifier 8 through choke coil 83 and load resistor 82. Here, capacitors 58 and 44 serve as bypass capacitors.

Tuning circuit $6_6$ is formed as a parallel tuning circuit wherein capacitor 40 and inductor 60 are connected in parallel to the output of optical detector 4. Resonance frequency f of the parallel tuning circuit is given by $$f = 1/(2\pi \sqrt{LC})$$

where C is the capacitance of capacitor 40 and optical detector 4, and L is the inductance of inductor 60. In this embodiment, L is 20 nH, and C is 2 pF including the capacitance of optical detector 4 and the input capacitance of amplifier 8. Accordingly, resonance frequency f of the tuning circuit is about 796 MHz. In this instance, the equivalent input noise current density around 800 MHz is always restricted to a very low value of 5 pA/$\sqrt{Hz}$ as seen from FIG. 8. Accordingly, a radio signal of 800 MHz can be received at a high sensitivity.

Meanwhile, capacitor 42 inserted in series to inductor 60 prevents a drop of the load impedance in a low frequency region of optical detector 4 to allow receiving of a low frequency signal. The capacitance of capacitor 42 is 100 pF, and the impedance at 800 MHz is a very low value of approximately 2Ω. Accordingly, capacitor 42 has little influence on the reception characteristic around 800 MHz. On the other hand, the impedance of capacitor 42 at 1 MHz is the very high value of approximately 1.6 kΩ. Consequently, the equivalent input noise current density around 1 MHz is restricted to 10 pA/$\sqrt{Hz}$ less, and accordingly, a carrier of the frequency of 1 MHz can also be received simultaneously at a high sensitivity.

It is to be noted that resistor 70 interposed between optical detector 4 and the ground is provided to bypass a dc photoelectric current. Since the resistance value of resistor 70 is set to the high value of 2 kΩ, resistor 70 has almost no influence on the receiving characteristics of a radio signal or a low frequency carrier.

As a modification to the sixth embodiment described above, resistor 70 for bypassing a photoelectric current may be replaced by an inductor having a sufficiently high inductance in the low frequency region, by a resistor and an inductor connected in series or by a resistor and an inductor connected in parallel. For example, where an inductor having an inductance of 50 μH is employed in place of resistor 70, a photoelectric current can be bypassed almost without influence on the receiving characteristics of a radio signal or a low frequency carrier.

Figure 9:
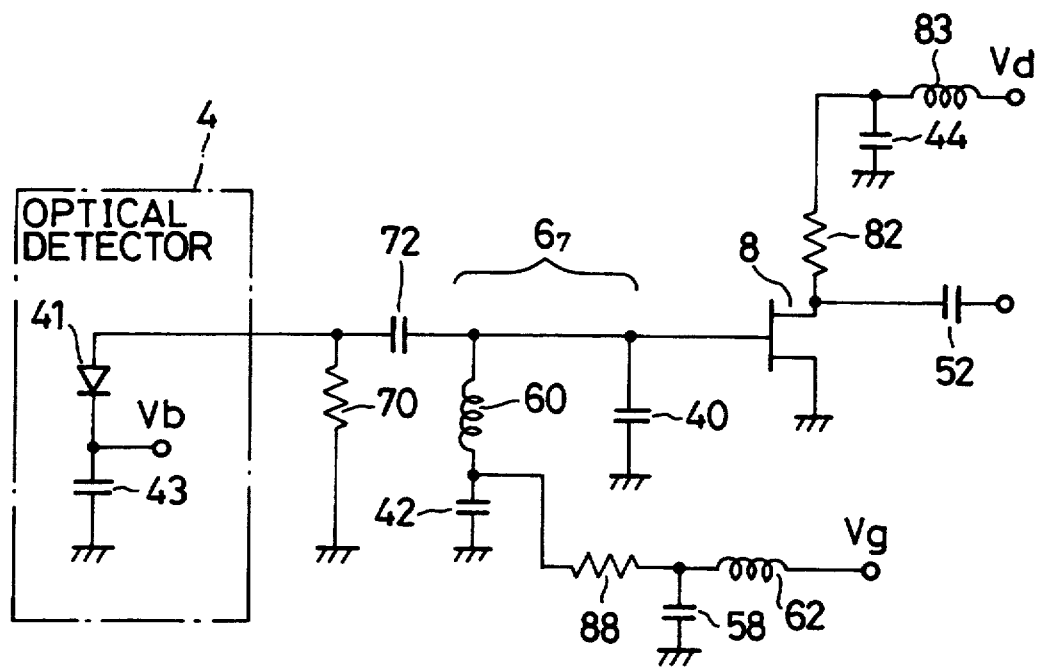
FIG. 9 is a circuit diagram of a seventh embodiment of the resonance-type optical receiver circuit of the present invention.

FIG. 9 is a view showing a seventh embodiment of the resonance-type optical receiver circuit of the present invention. In this embodiment, the gate voltage of an FET which is employed as receiver 8 is supplied to the junction between inductor 60 and capacitor 42 through resistor 88, choke coil 62 and bypass capacitor 58. Further, capacitor 72 for blocking the dc components is interposed between resistor 70 and resonance circuit 6$_7$. The resistance value of resistor 88 is 10 kΩ, and the gate voltage can be supplied almost without having an influence on the receiving characteristics of a radio signal or a low frequency carrier. Further, the capacitance of capacitor 72 is 0.1 μF, and the impedance of capacitor 72 has such a low value for a radio signal or a low frequency carrier that can be almost ignored. The frequency characteristic of the equivalent input noise current density of the optical receiver circuit according to this embodiment is almost the same as the characteristic of the sixth embodiment shown in FIG. 8.

FIG. 10 is a circuit diagram showing an eighth embodiment of the resonance-type optical receiver circuit of the present invention. This embodiment is different from the sixth embodiment in that resistor 45 for bypassing a photoelectric current is inserted in parallel to capacitor 42. The resistance value of resistor 45 is set to 2 kΩ, and resistor 45 can bypass a photoelectric current almost without influence on the receiving characteristics of a radio signal or a low frequency carrier.

As a modification to the eighth embodiment, resistor 45 for bypassing a photoelectric current may be replaced by an inductor having a sufficiently high inductance in the low frequency region, by a resistor and an inductor connected in series or by a resistor and an inductor connected in parallel. For example, where a resistor of 1 kΩ and an inductor of 25 μH connected in series are employed in place of resistor 45 of FIG. 10, a photoelectric current can be bypassed almost without influence on the receiving characteristics of a radio signal or a low frequency carrier. An optical receiver circuit having almost the same characteristics as those of the sixth embodiment can be realized by this embodiment.

Figure 12:
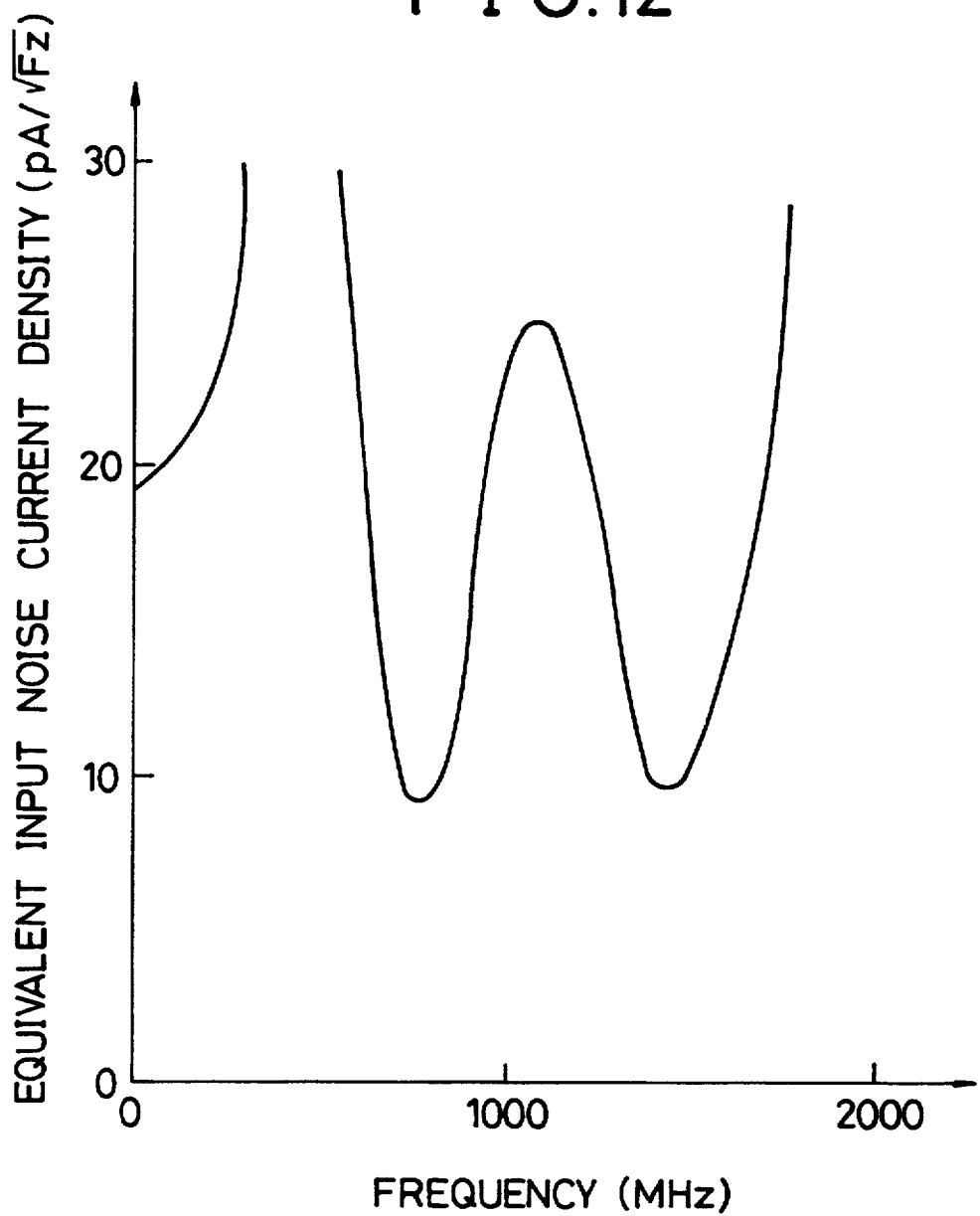
FIG. 12 is a diagram showing a frequency characteristic of the equivalent input noise current density of the ninth embodiment.

FIG. 11 is a circuit diagram showing a ninth embodiment of the resonance-type optical receiver circuit of the present invention. Further, FIG. 12 is a graph showing the frequency characteristic of the equivalent input noise current density of the optical receiver circuit of the ninth embodiment. In this embodiment, a tuning circuit of the transformer type having two resonance frequencies is employed, and radio signals of 800 MHz and 1,500 MHz can be received simultaneously. Further, a digital signal of a bit rate of 2,400 bps can be received.

Tuning circuit 6$_9$ including inductors 46, 48 and 50 and capacitors 34 and 36 shown in FIG. 11 has the same configuration as the equivalent circuit of a transformer and is called a tuning circuit of the transformer type. In the present embodiment, the inductances of inductors 35, 37 and 60 are 27 nH, 0.1 nH and 10 nH, respectively. Meanwhile, the capacitances of capacitors 34 and 36 are 0.8 pF and 2 pF, respectively. It is to be noted that the capacitance of capacitor 34 includes the capacitance of optical detector 4 and the capacitance of capacitor 36 includes the input capacitance of amplifier 8. Present tuning circuit 6$_9$ has two resonance frequencies of 810 MHz and 1,450 MHz. Accordingly, as seen in FIG. 12, the equivalent input noise current densities around 800 MHz and 1,500 MHz are restricted to 8 pA/$\sqrt{Hz}$ and radio signals of 800 MHz and 1,500 MHz can be received simultaneously at a high sensitivity.

Further, in the ninth embodiment, resistor 38 is inserted in series to inductor 60. Accordingly, the load impedance of optical detector 4 for the current in proximity to the dc current is 75Ω, and as shown in FIG. 12, the equivalent input noise current density for the current in proximity to the dc current is 20 pA/$\sqrt{Hz}$. Consequently, a digital signal of a bit rate of 2,400 bps can be received simultaneously with a radio signal or signals.

Various modifications can be made to the embodiments of the present invention described above. For example, while an FET of the source-grounded type is employed as amplifier 8 in the embodiments described above, it is possible to employ some other amplifier such as, for example, a transistor, an FET of the gate-grounded type or an amplifier of the integration type.

Further, while PIN photodiode 10 is employed for optical detector 4 in the embodiments described above, it is also possible to employ some other optical detector such as, for example, a photodiode, an avalanche photodiode or a phototransistor.

Further, while a parallel tuning circuit is employed for tuning circuits 6$_6$, 6$_7$, 6$_8$ in the sixth, seventh and eighth embodiments and a tuning circuit of the transformer type is employed for tuning circuit 6$_9$ in the ninth embodiment, it is also possible to employ some other tuning circuit such as, for example, a mixed tuning circuit or a third-order band pass tuning circuit.

Furthermore, in the sixth, seventh and eighth embodiments, capacitor 40 of tuning circuit $6_6$ can be omitted by using the capacitance of optical detector 4 or the input capacitance of amplifier 8. Similarly, in the ninth embodiment, capacitor 34 can be omitted by using the capacitance of optical detector 4, and capacitor 36 can be omitted by using the input capacitance of amplifier 8. Further, in the ninth embodiment, inductor 35 can be omitted by making use of the output inductance of optical detector 4, and inductor 37 can be omitted by using the input inductance of amplifier 8.

What is claimed is:

1. A method of receiving a light wave of a resonance-type optical receiver circuit including an optical detector, an amplifier and a tuning circuit interposed between said optical detector and said amplifier, characterized in that said method comprises the procedure of varying a tuning frequency in response to a signal outputted from said amplifier to keep an input level to said amplifier lower than a fixed value.

2. A resonance-type optical receiver circuit including an optical detector, an amplifier and a tuning circuit interposed between said optical detector and said amplifier, characterized in that said optical receiver circuit comprises a variable capacitance element provided in said tuning circuit and having a capacitance whose value automatically varies in response to a variation of a control voltage, and a control circuit for generating a voltage of the difference between an output voltage of said amplifier and a predetermined reference voltage and outputting said voltage corresponding to said difference voltage as a control voltage to said variable capacitance element to keep an input level to said amplifier lower than a fixed value.

* * * * *